United States Patent
Tackman et al.

(10) Patent No.: US 7,051,364 B1
(45) Date of Patent: May 23, 2006

(54) SYSTEM AND METHOD FOR PREPARING, EXECUTING, AND SECURELY MANAGING ELECTRONIC DOCUMENTS

(75) Inventors: Robert B. Tackman, Fairfield, CT (US); Michael H. Forrest, Norwalk, CT (US)

(73) Assignee: DaimlerChrysler Financial Services Americas LLC, Farmington Hills, MI (US)

( * ) Notice: Subject to any disclaimer, the term of this patent is extended or adjusted under 35 U.S.C. 154(b) by 0 days.

(21) Appl. No.: 09/392,938

(22) Filed: Sep. 9, 1999

(51) Int. Cl.
*H04L 9/32* (2006.01)

(52) U.S. Cl. .......................... 726/3; 705/80
(58) Field of Classification Search ............... 713/201, 713/185, 170, 155, 156; 709/203; 705/35, 705/36, 80, 62, 64, 67, 75, 76; 380/49; 726/3
See application file for complete search history.

(56) References Cited

U.S. PATENT DOCUMENTS

| | | | | |
|---|---|---|---|---|
| 5,892,900 | A | * | 4/1999 | Ginter et al. ............... 713/200 |
| 5,987,140 | A | * | 11/1999 | Rowney et al. ............... 705/79 |
| 6,073,242 | A | * | 6/2000 | Hardy et al. ................ 713/201 |
| 6,085,247 | A | * | 7/2000 | Parsons et al. ............. 709/227 |
| 6,141,653 | A | * | 10/2000 | Conklin et al. ............... 705/80 |
| 6,327,658 | B1 | * | 12/2001 | Susaki et al. ............... 713/176 |
| 2002/0065753 | A1 | * | 5/2002 | Schloss et al. ................ 705/35 |

OTHER PUBLICATIONS

Part ii. Interest Laws, Uniform Commercial Code (Articles 3, 4, and 9), Retail Installment Sales Act and Escheats Laws. Chapter 25. Uniform Commercial Code. Article 9. Secured Transactions. Part 1. General Provisions.*
355.9-105 Control of electronic chattel paper.*

* cited by examiner

*Primary Examiner*—Kim Vu
*Assistant Examiner*—T. B. Truong
(74) *Attorney, Agent, or Firm*—Ralph E. Smith

(57) ABSTRACT

A system and a method for creating and controlling electronic agreements. In general, the system includes a server and at least one client interconnected through a communications medium. In operation, the system only allows access to authorized users. Once a user gains access, the user inputs commands and data that are necessary to create an electronic document. Upon completion of the electronic document, the user can invoke a signature process. During the signature process, the parties to the agreement enter electronic signatures. The present invention operates to encrypt the electronic document and then encrypts each of the signatures using an encryption key that is based, at least in part, on the contents of the electronic document. This aspect of the system prevents the creation of fraudulent versions of the electronic document because any modifications to the electronic document will invalidate the encrypted signatures. Finally, the system operates to transfer the electronic agreement to a secure server. The server maintains the authoritative copy of the electronic agreement, thereby providing control of the electronic agreement.

20 Claims, 10 Drawing Sheets

SYSTEM AND METHOD FOR PREPARING, EXECUTING, AND SECURELY MANAGING ELECTRONIC DOCUMENTS

TECHNICAL FIELD

This invention relates to electronic commerce and, more particularly, to a system and method that enables individuals to complete electronic forms, such as purchasing agreements, sign the electronic forms, and that provides secure management of the electronic forms to prevent tampering or modifying the forms once the interested parties partially or fully execute the electronic forms.

BACKGROUND INFORMATION

As the world of telecommunications, computer networking, and electronics continues to expand, the world as we know it grows smaller. Sitting in the glow of a computer screen, an individual can instantaneously access information on the opposite side of the planet. As computing and interconnected communication capabilities continue to integrate into the daily activities of individuals, new and useful ideas bubble up to the surface. In general, many of these ideas take the form of converting a task, that has traditionally been performed manually, into an electronic commerce process. As an electronic commerce process, transactions that once took days and weeks to perform through the mail can be completed virtually instantaneously over the Internet or through other networking means.

Advances in technology usually precede changes in fields and disciplines that are ancillary to the technology. This phenomenon is apparent in the realm of legal issues regarding electronic commerce. One example of this phenomenon is in the area of electronic agreements. The Uniform Commercial Code (UCC), drafted by the National Conference of Commissioners on Uniform State Laws, is directed towards providing a uniform body of state law governing commercial transactions. Under the UCC, a chattel paper is a written instrument identifying a monetary obligation and a security interest in or a lease of specific goods. In many cases, the chattel paper will take the form of a negotiable instrument coupled with a security agreement. Section 9 of the UCC sets forth that a security interest in chattel paper is perfected by possession. In the physical world, possession is obvious—the holder of the signed original paper is in possession of the chattel paper. However, in the world of e-commerce, possession is not so obvious.

In cyberspace, where an agreement may exist in electronic form (i.e., electronic chattel paper), it is difficult to determine who has possession of an electronic chattel paper. It is an easy task for a party to create an identical copy of an electronic file and distribute that copy to others. In this situation, it appears impossible to identify which copy of the file is original, and thus, to identify who has possession of the original. However, from a legal perspective, it is necessary to be able to distinguish an original electronic chattel from a copy. Thus, there is a need in the art for a technique to maintain an original authoritative copy of an electronic chattel paper and to distinguish it from copies.

Currently, proposals to revise Section 9 of the UCC are under consideration. In general, these proposals are directed towards providing that a security interest in electronic chattel paper is perfected by control. The proposed revisions to the UCC, state that a party is considered to have control of an electronic chattel paper if the records comprising the electronic chattel paper are created, stored, and assigned in such a manner that: (1) a single authoritative copy of the record or records exists which is unique, identifiable and, except as otherwise provided . . . , unalterable; (2) the authoritative copy identifies the secured party as the assignee of the record or records; (3) the authoritative copy is communicated to and maintained by the secured party or its designated custodian; (4) copies or revisions that add or change an identified assignee of the authoritative copy can be made only with the participation of the secured party; (5) each copy of the authoritative copy and any copy of a copy is readily identifiable as a copy that is not the authoritative copy; and (6) any revision of the authoritative copy is readily identifiable as an authorized or unauthorized revision. Thus, there is a need in the art for a system and method to provide for the control of an electronic chattel paper that meets some or all of these requirements. There is also a need in the art for a system and method to create electronic agreements in a distributed environment, but maintain the ability to identify the party having control of the electronic agreement.

Therefore, it can be seen that there is a need in the art for a system and method that enables individuals to complete electronic forms, such as purchasing agreements, sign the electronic forms, and that provides secure management of the electronic forms to prevent tampering or modifying the forms once the interested parties partially or fully execute the electronic forms.

BRIEF SUMMARY OF THE INVENTION

The present invention satisfies the above-identified needs in the art by providing a system and method for creating and controlling electronic agreements. The system includes a server and at least one client interconnected through a communications medium. The system only allows access to authorized users. Once a user gains access, the user inputs commands and data that are necessary to create an electronic document. Upon completion of the electronic document, the user can invoke a signature process. During the signature process, the parties to the agreement enter electronic signatures. Completing the signature process results in the creation of a binding electronic agreement. The present invention operates to encrypt the electronic document and then encrypts each of the signatures using an encryption key that is based, at least in part, on the contents of the electronic document. This aspect of the present invention prevents the propagation of fraudulent versions of the electronic document. Any modifications to the electronic document will result in destroying the ability to generate the encryption key used to encrypt the signatures. Thus, the signatures cannot be decrypted if the electronic document is modified, thereby, invalidating the electronic agreement. Finally, the system operates to transfer the electronic agreement to a secure server. The server maintains the authoritative copy of the electronic agreement, thereby providing control of the electronic agreement.

Therefore, it can be seen that the present invention provides a system and method to provide for the control of an electronic chattel paper that meets some or all of the requirements proposed in the modifications to the UCC. The present invention also provides a system and method to create electronic agreements in a distributed environment, but maintains the ability to identify the party having control of the electronic agreement.

Advantageously, the present invention provides a system and method to enable individuals to complete electronic forms, such as purchasing agreements, sign the electronic forms, and provide secure management of the electronic forms to prevent tampering or modifying the forms once the interested parties partially or fully execute the electronic forms.

DETAILED DESCRIPTION OF EXEMPLARY EMBODIMENTS

The present invention provides a system and method for creating and controlling electronic agreements. The system includes a server and at least one client interconnected through a communications medium. Turning now to the figures in which like numbers refer to like elements throughout the several views, various embodiments of the present invention are presented.

Figure 1:
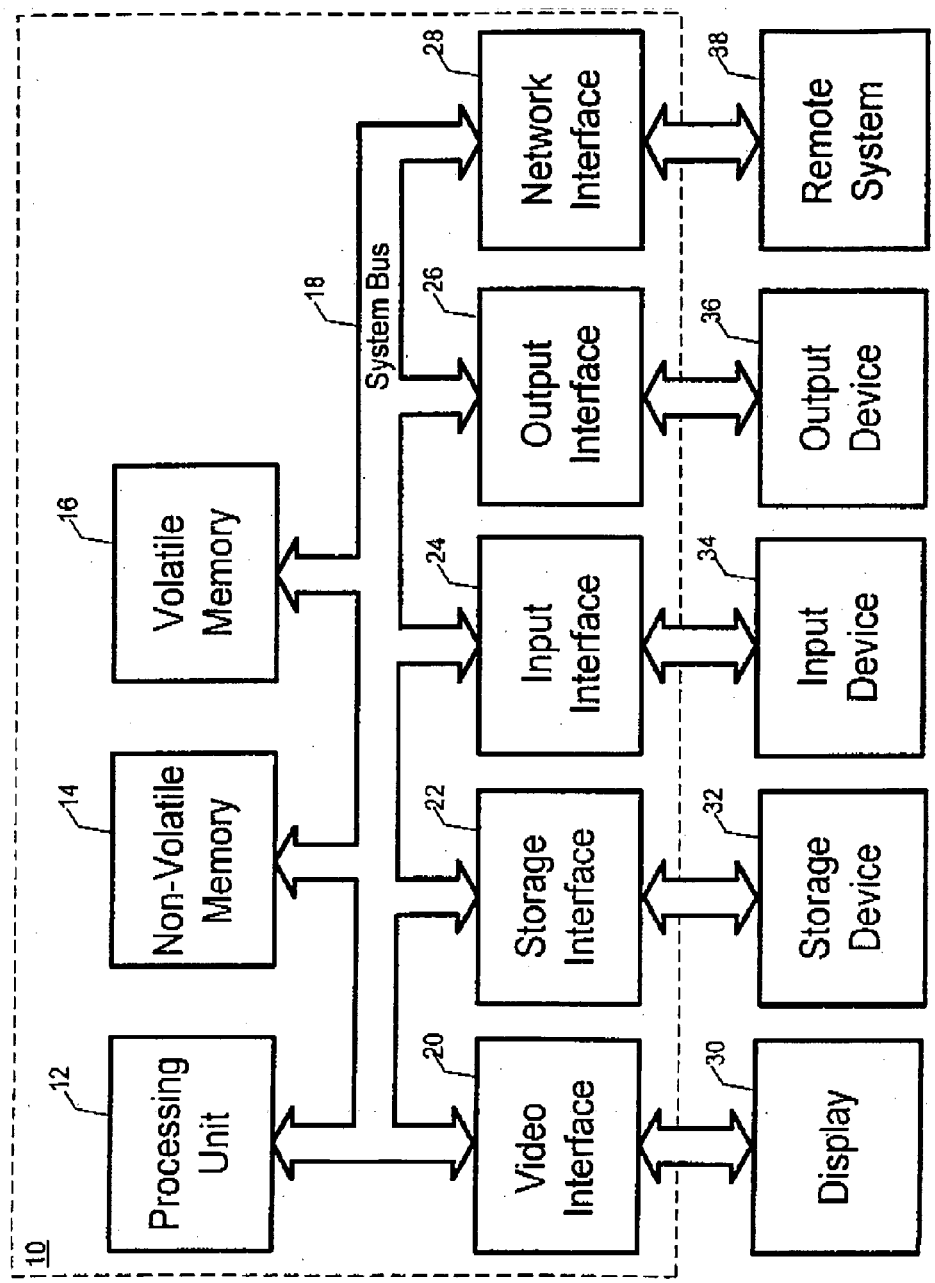
FIG. 1 is a system diagram that illustrates an exemplary environment suitable for implementing various embodiments of the present invention or aspects of the present invention.

FIG. 1 is a system diagram that illustrates an exemplary environment suitable for implementing various embodiments of the present invention. FIG. 1 and the following discussion provide a general overview of a platform onto which various aspects of the invention may be integrated or implemented. Although in the context of the exemplary environment the invention is described as consisting of instructions within a software program being executed by a processing unit, those skilled in the art will understand that portions of the invention, or the entire invention itself may also be implemented by using hardware components, state machines, or a combination of any of these techniques. In addition, a software program implementing an embodiment of the invention may run as a stand-alone program or as a software module, routine, or function call, operating in conjunction with an operating system, another program, system call, interrupt routine, library routine, or the like. The term program module is used to refer to software programs, routines, functions, macros, data, data structures, or any set of machine readable instructions or object code, or software instructions that can be compiled into such, and executed by a processing unit.

Those skilled in the art will appreciate that the system illustrated in FIG. 1 may take on many forms and may be directed towards performing a variety of functions. Examples of such forms and functions include mainframe computers, mini computers, servers, work stations, personal computers, hand-held devices such a personal data assistants and calculators, consumer electronics, note-book computers, lap-top computers, and a variety of other applications, each of which may serve as an exemplary environment for embodiments of various aspects of the present invention. The invention may also be practiced in a distributed computing environment where tasks are performed by remote processing devices that are linked through a communications network. In a distributed computing environment, program modules may be located in both local and remote memory storage devices.

The exemplary system illustrated in FIG. 1 includes a computing device 10 that is made up of various components including, but not limited to a processing unit 12, non-volatile memory 14, volatile memory 16, and a system bus 18 that couples the non-volatile memory 14 and volatile memory 16 to the processing unit 12. The non-volatile memory 14 may include a variety of memory types including, but not limited to, read only memory (ROM), electronically erasable read only memory (EEROM), electronically erasable and programmable read only memory (EEPROM), electronically programmable read only memory (EPROM), electronically alterable read only memory (EAROM), and battery backed random access memory (RAM). The non-volatile memory 14 provides storage for power on and reset routines (bootstrap routines) that are invoked upon applying power or resetting the computing device 10. In some configurations the non-volatile memory 14 provides the basic input/output system (BIOS) routines that are utilized to perform the transfer of information between elements within the various components of the computing device 10.

The volatile memory 16 may include a variety of memory types and devices including, but not limited to, random access memory (RAM), dynamic random access memory (DRAM), FLASH memory, EEROM, bubble memory, registers, or the like. The volatile memory 16 provides temporary storage for routines, modules, functions, macros, data etc. that are being or may be executed by, or are being accessed or modified by the processing unit 12. In general, the distinction between non-volatile memory 14 and volatile memory 16 is that when power is removed from the computing device 10 and then reapplied, the contents of the non-volatile memory 14 remain in tact, whereas the contents of the volatile memory 16 are lost, corrupted, or erased.

The computing device 10 may access one or more external display devices 30 such as a CRT monitor, LCD panel, LED panel, electro-luminescent panel, or other display device, for the purpose of providing information or computing results to a user. The processing unit 12 interfaces to each display device 30 through a video interface 20 coupled to the processing unit 12 over the system bus 18.

The computing device 10 may have access to one or more external storage devices 32 such as a hard disk drive, a magnetic disk drive for the purpose of reading from or writing to a removable disk, and an optical disk drive for the purpose of reading a CD-ROM disk or to read from or write to other optical media, as well as devices for reading from and or writing to other media types including, but not limited to, FLASH memory cards, Bernoulli drives, magnetic cassettes, magnetic tapes, or the like. The processing unit 12 interfaces to each storage device 32 through a storage interface 22 coupled to the processing unit 12 over the system bus 18. The storage devices 32 provide non-volatile storage for the computing device 10.

The computing device 10 may receive input or commands from one or more input devices 34 such as a keyboard, pointing device, mouse, modem, RF or infrared receiver, microphone, joystick, track ball, light pen, game pad, scanner, camera, electronic writing pad, or the like. The processing unit 12 interfaces to each input device 34 through an input interface 24 coupled to the processing unit 12 over the system bus 18. The input interface may include one or more of a variety of interfaces, including but not limited to, an RS-232 serial port interface or other serial port interface, a parallel port interface, a universal serial bus (USB), an optical interface such as infrared or IRDA, an RF or wireless interface such as Bluetooth, or other interface.

The computing device 10 may send output information, in addition to the display 30, to one or more output devices 36 such as a speaker, modem, printer, plotter, facsimile machine, RF or infrared transmitter, or any other of a variety of devices that can be controlled by the computing device 10. The processing unit 12 interfaces to each output device 36 through an output interface 26 coupled to the processing unit 12 over the system bus 18. The output interface may include one or more of a variety of interfaces, including but not limited to, an RS-232 serial port interface or other serial port interface, a parallel port interface, a universal serial bus (USB), an optical interface such as infrared or IRDA, an RF or wireless interface such as Bluetooth, or other interface.

The computing device 10 may operate in a networked environment using logical connections to one or more remote systems, such as a remote computer 38. The remote computer 38 may be a server, a router, a peer device or other common network node, and typically includes many or all of the elements described relative to the computing device 10. When used in a networking environment, the computing device 10 is connected to the remote system 38 over a network interface 28. The connection between the remote computer 38 and the network interface 28 depicted in FIG. 1 may include a local area network (LAN), a wide area network (WAN), a telephone connection, or the like. These types of networking environments are commonplace in offices, enterprise-wide computer networks, intranets and the Internet.

It will be appreciated that program modules implementing various embodiments of the present invention may be may be stored in the storage device 32, the non-volatile memory 14, the volatile memory 16, or in a networked environment, in a remote memory storage device of the remote system 38. The program modules may include an operating system, application programs, other program modules, and program data. The processing unit 12 may access various portions of the program modules in response to the various instructions contained therein, as well as under the direction of events occurring or being received over the input interface 24 and the network interface 28.

Figure 2:
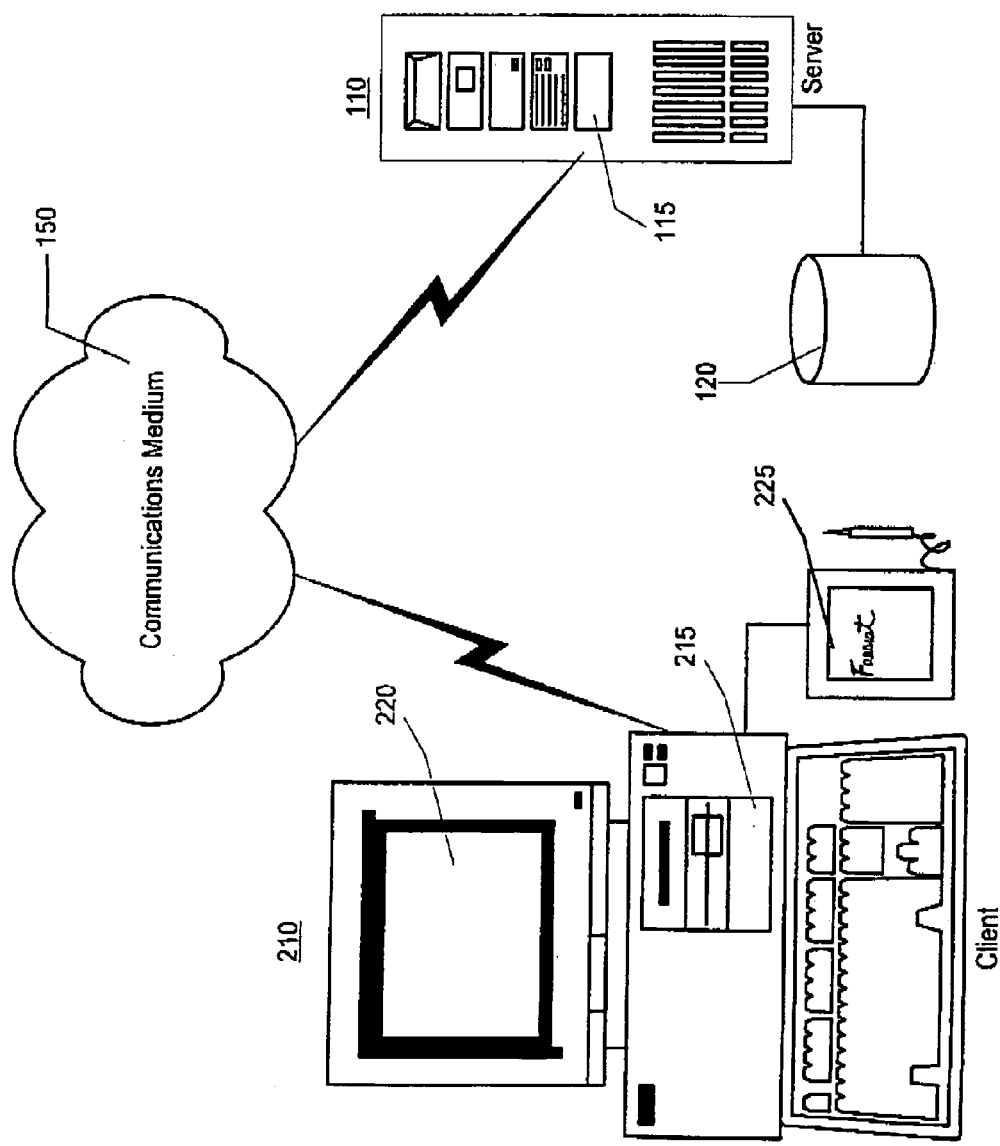
FIG. 2 is a system diagram that illustrates an exemplary embodiment of the present invention in a distributed environment.

FIG. 2 is a system diagram that illustrates an exemplary embodiment of the present invention in a distributed environment. This embodiment of the present invention is described as a system and a method to generate and manage agreements for purchasing or selling automobiles for Mercedes Benz Credit Corporation (MBCC). However, those skilled in the art will appreciate that this embodiment of the present invention is only one possible application of the principles and aspects of the present invention and should not limit the present invention in any manner.

The present invention has been implemented by MBCC within its MB Advantage System. The MB Advantage System includes a program module ("MB Advantage Software") that operates on a single, stand alone computer system, or on multiple computer systems that share information. The MB Advantage System provides several functions such as managing customer information, generating pay-off quotes, preparing and processing credit applications, and other functions related to the purchasing and leasing of automobiles.

More particularly, the MB Advantage Software includes two main components, the Server Program 115 and the Client Program 215, which are respectively installed and operate on a server 110 and a client 210. The Server Program 115 and the Client Program 215 include various software components that implement aspects of the present invention. The applicant collectively refers to these software components as the Credit Highway. In general, the Credit Highway allows traditional paper contracts to be replaced with electronic contracts. This aspect of the present invention enables retailers to prepare and deliver electronic leases and retail installment contracts, including security agreements, all related to the lease or purchase of an automobile.

The server 110 operates as the central storage location for electronic agreements. The server may include a single computer or system or several computer systems or servers that share resources. In an exemplary embodiment, the server 110 is dedicated to the operation of the MB Advantage System and includes two servers operating under the Windows NT operating system and running the Server Program 115 and two servers controlling a central database 120. The central database contains, among other items, any electronic agreements that a user generates using the MB Advantage System.

Each client 210 is typically located at a retailer location and operates as a terminal for the entry of data. Each client 210 is a networked or stand-alone computer and operates under the control of the Client Program 215. The Client Program 215 enables the client 210 to communicate with the server 110 over a communications medium 150. Depending on the particular configuration of a client 210, the communications medium 150 may be an Internet-based connection, a dedicated or shared telephone line, a NetStar network connection, or other similar communication media. In an exemplary embodiment, the client 210 also includes display 220, a keyboard 230, and an electronic signature pad 225.

Figure 3:
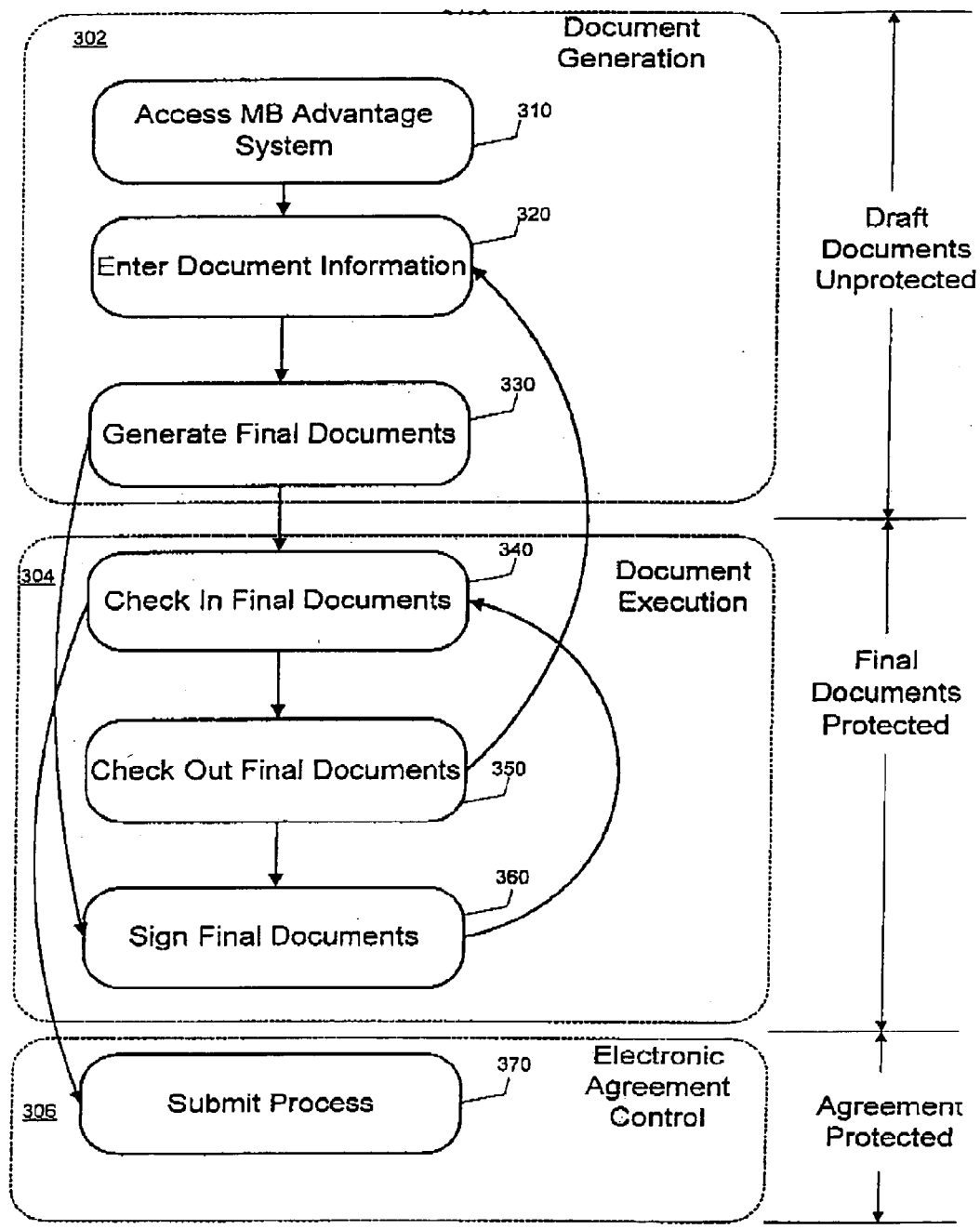
FIG. 3 is a flow diagram illustrating the operation of an embodiment of the present invention.

FIG. 3 is a flow diagram illustrating the operation of an embodiment of the present invention. The Credit Highway component of the MB Advantage System enables the preparation and secure management of electronic agreements including leasing agreements and retail installment contracts. In general, the operation of the Credit Highway includes three phases:

(a) Document Generation 302;
(b) Document Execution 304; and
(c) Electronic Agreement Control 306.

The Document Generation Phase 302 involves the client 110 and the server 210. To enter the Document Generation Phase, a user must first gain access to the MB Advantage System from the client 210 and invoke the Credit Highway function. After invoking the Credit Highway function, the retailer operates the Credit Highway to perform several functions including selecting various options and entering customer data into the system. After successfully generating a final and executable document, the retailer may cause the Credit Highway to exit the Document Generation Phase 302. The retailer, utilizing the Credit Highway, completes these tasks by performing Steps 310, 320, and 330 as illustrated in FIG. 3 and further described below.

At step 310, the user gains access to the MB Advantage System. The MB Advantage System includes password protection to prevent unauthorized access. A user gains access to the MB Advantage System through the client 210. The Client Program 215 running on the client 210 prompts the user to enter a user identification and a password. The Client Program 215 receives the user identification and password and communicates the information to the server 110 over communications medium 150. The Server Software 115 running on the server 110, receives and verifies the authenticity of the user identification and the password. If the user identification and password are authentic, then the Server Software 115 generates an authorized indicator or a Transaction Token and communicates this Transaction Token to the Retailer System.

A Transaction Token received from the server 110 is simply a string of characters that are known only to the client 210 and the server 110. The Transaction Token remains valid until the user logs off of the MB Advantage System, thereby ending the session, or upon the expiration of a timer (typically 24 hours). Based on the user identification, the Server Program 115 identifies the rights and privileges of the user and associates these rights and privileges with the Transaction Token. Each subsequent communication between the client 210 and the server 110 during the current session must include this Transaction Token. Thus, the Transaction Token is used to validate each transaction request and communication between the client 210 and the server 110. To maintain security, the user identification and passwords are periodically changed, such as every 30 days. Upon receiving the Transaction Token, the user has access to the MB Advantage System and processing continues at step 320.

Figure 5:
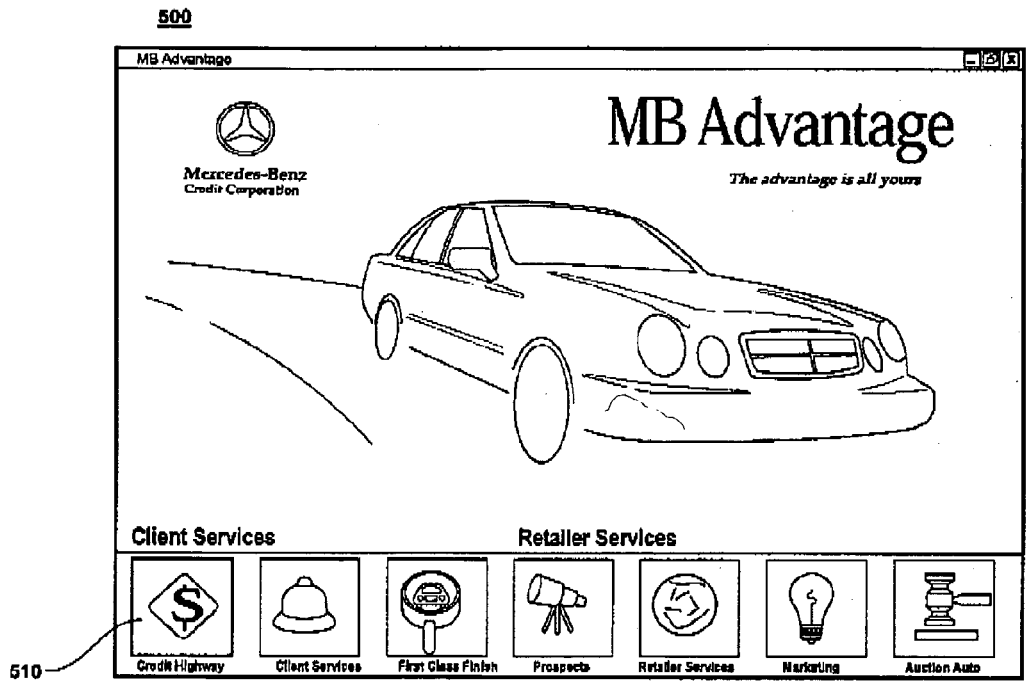
FIG. 5 is a diagram of an opening screen for an exemplary embodiment of the present invention.

At step 320, the user enters document information. Initially, the client 210 displays an opening screen on the display 220. The opening screen provides a list of retailer services that the user can select. FIG. 5 is a diagram of a typical opening screen 500 displayed by an exemplary embodiment of the present invention. The user invokes the Credit Highway component by selecting the Credit Highway icon 510 displayed on the opening screen 500 or by entering an appropriate keyboard command on keyboard 230. In general, the entry of document information involves the user selecting various options or functions and entering data into the system.

Figure 6:
FIG. 6 is a diagram of an input screen for an exemplary embodiment of the present invention.

The first option that a user may select is to request either a retail or lease quote. Upon selecting a quote type, the Client Program 215 operates to determine a contract type. The Client Program 215 determines the contract type based on the type of quote the user requests, along with other information, such as the state in which the client 215 is operating. The Client Program 215 then allows the user to select a series of input screens. Each input screen identifies required and optional information for the user to enter. The user enters the information by moving a cursor to a labeled input field and typing in the appropriate information e.g., Buyer Name, Billing Address, etc.). As the retailer enters the information, the Client Program 215 reads and stores the information. FIG. 6 is a diagram of a typical input screen 600 displayed by an exemplary embodiment of the present invention.

Figure 7:
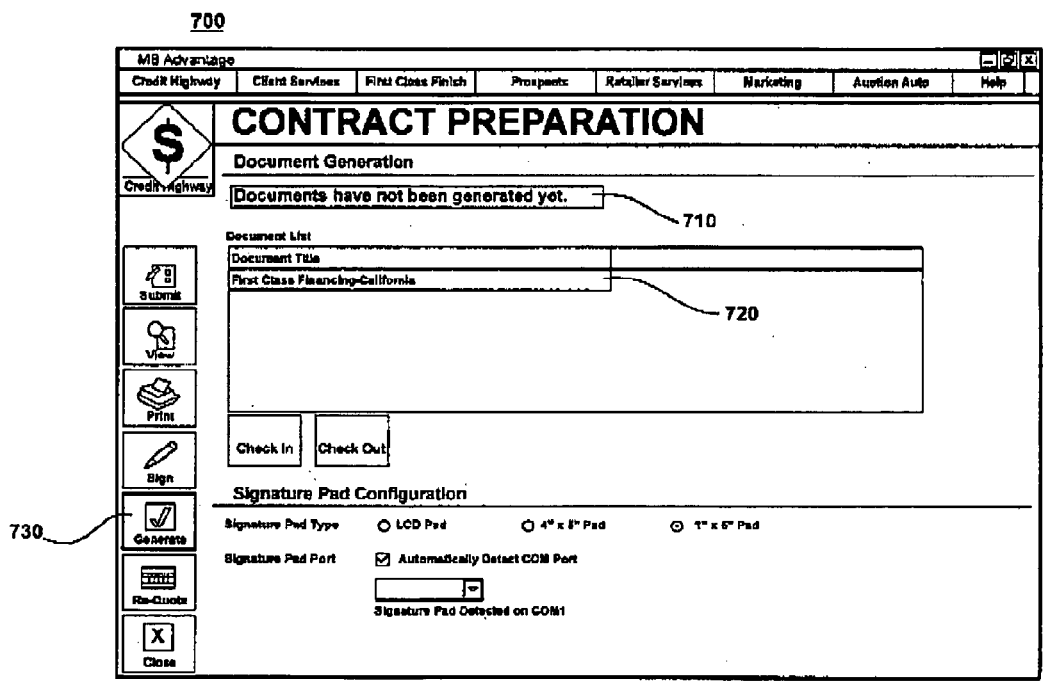
FIG. 7 is a diagram of a document generation screen for an exemplary embodiment of the present invention.

At step 330, the user causes the client 210 to generate final documents. After the user enters all of the required information, the MB Advantage Client Software 215 displays or enables a "Select Documents" icon 610 (shown in FIG. 6). In response to the user selecting the "Select Documents" icon 610, the Client Program 215 displays a Document Generation screen. FIG. 7 is a diagram of a typical document generation screen displayed by an exemplary embodiment of the present invention. The Document Generation screen 700 includes a status indicator 710 and a document list 720. At this state, the status indicator 710 indicates that the documents have not yet been generated. The document list 720 identifies each of the documents that will be generated for the identified contract type. The Document Generation screen 700 also includes a "Generate" icon 730. The user may select the "Generate" icon to cause the Client Program 215 to generate final or executable documents.

Figure 8:
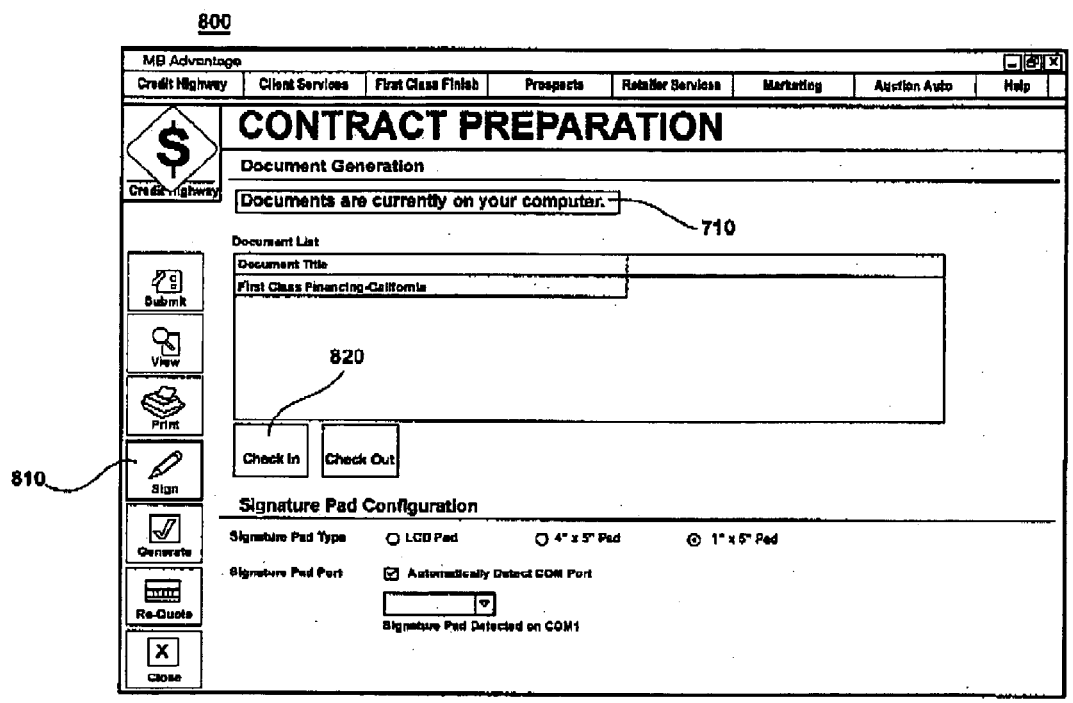
FIG. 8 is a diagram of another document generation screen for an exemplary embodiment of the present invention.

In response to selecting the "Generate" icon 730, the Client Program 215 (a) merges the information input by the retailer with document templates associated with the documents identified in the document list 720, (b) encrypts the documents, and (c) compresses and combines the documents into a single electronic file. After generating the documents, the Client Program 215 updates the status indicator 710 of the Document Generation screen 700 to indicate that the client 210 contains the final documents and displays or enables "Sign" and "Check In" icons. FIG. 8 is a diagram of a typical document generation screen displayed by an embodiment of the present invention in this state. At this point, the final documents are ready for execution and cannot be modified. However, the final documents do not constitute a binding agreement at this point.

The Client Program 215 encrypts the final documents prior to storing them on the client 210. The input to the encryption process includes the unencrypted final documents and a document encryption key. The Client Program 215 generates the document encryption key based on a proprietary algorithm and a proprietary set of data. Those skilled in the art will understand that a variety of techniques may be used to generate a secure encryption key and it is not necessary to disclose the proprietary algorithm used by MBCC to enable the present invention. The Client Program 215 also generates an encryption key to be used for encrypting one or more signature files ("Signature Key"). The signature files contain digital representations of the signatures of various parties. The Signature Key is based, at least in part, on the contents of the unencrypted final documents. Basing the Signature Key on the unencrypted final documents prevents creation of fraudulent final documents. For instance, if the final documents are modified, then the Credit Highway can no longer generate the Signature Key. As a result, the Credit Highway can also no longer decrypt the signature files. Thus, the signature files become invalid if a party modifies the final documents.

After generating the necessary keys, the Client Program 215 encrypts the final documents and any signature files using the appropriate encryption keys.

The Client Program 215 combines the encrypted final documents and the encrypted signature files into a single file and compresses the file using a commercially available compression program. Those skilled in the art will be aware of a variety of such compression algorithms and the present invention can be implemented using any such variety or by eliminating the compression step all together. In addition, those skilled in the art will understand that combining the final documents and signature files into a single file is only one possible technique for storing and managing the files. Other embodiments may use multiple files of store portions of the files into various other files. The Client Program 215 also password protects the compressed file using a proprietarily generated password. The decompressing of the compressed file requires the provision of this password.

The Client Program 215 automatically stores the final documents on the client 210. The user may cause the Credit Highway to exit the Document Generation Phase 302 by either (a) logging off of the MB Advantage System or (b) entering the Document Execution Phase 304 as described below.

The Client Program 215 will enter the Document Execution Phase 304 from the Document Generation Phase 302 in response to the user selecting either the "Sign" icon 810 or the "Check In" icon 820. If the user selects the "Sign" icon 810, the Client Program 215 will enter the Document Execution Phase 304 at step 360. If the user selects the "Check In" icon 820, the Client Program 215 will enter the Document Execution Phase 304 at step 340. To enter the Document Execution Phase 304 at the beginning of a new session, as described above, an authorized user must gain access to the MB Advantage System, invoke the Credit Highway, complete the requirements of the Document Generation Phase 302 if necessary, and select either the "Sign" icon 810 or the "Check In" icon 820.

The Document Execution Phase 304 involves the client 210 and the server 110. In the Document Execution Phase 304, the user may invoke three functions: Check In final documents, Check Out final documents, or Sign final documents. After the final documents have been fully signed, the user may cause the Credit Highway to exit the Document Execution Phase 304. The user, utilizing the Credit Highway, completes these tasks by performing some or all of steps 340, 350, and 360 as illustrated in FIG. 3 and further described below.

Figure 9:
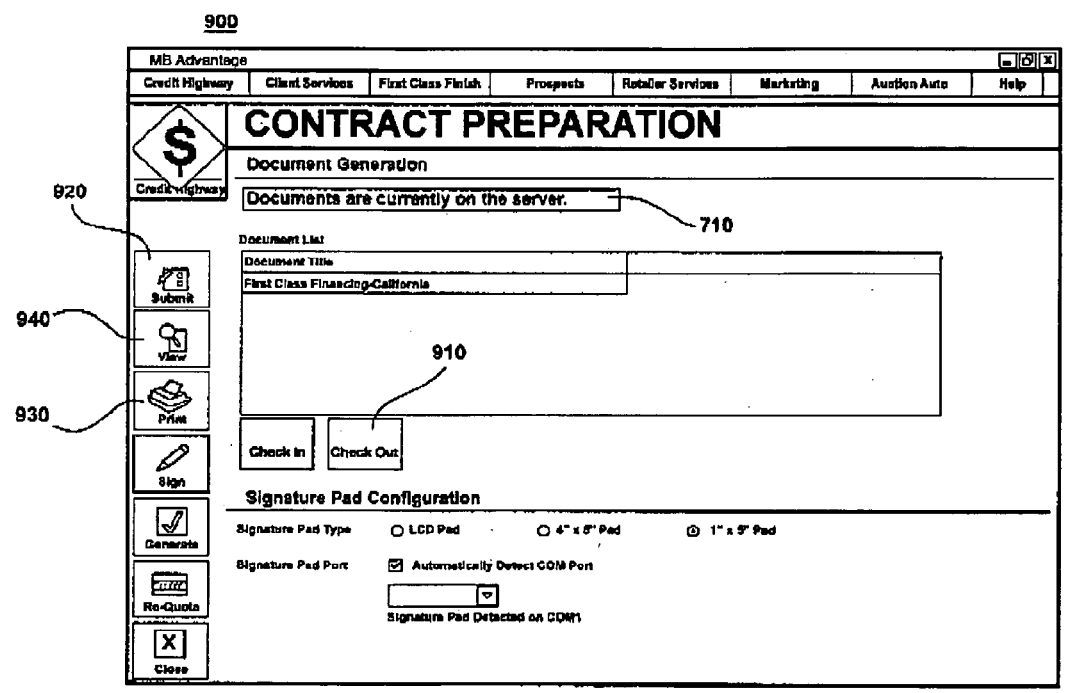
FIG. 9 is a diagram of yet another document generation screen for an exemplary embodiment of the present invention.

At step 340, the user checks in the final documents. The check in process results in moving the encrypted and compressed final documents from the client 210 to the server 110 over communications medium 150. The user initiates the check in process by selecting the "Check In" icon 820 on the Document Generation screen 800. After performing the check in process, the Client Software 215 updates the status indicator 710 of the "Document Generation" screen to indicate that the server 110 contains the final documents. FIG. 9 is a diagram of a typical document generation screen displayed by an exemplary embodiment of the present invention in this state.

At step 350, the user checks out the final documents. The user may invoke the check out process by selecting the "Check Out" icon 910 on the document generation screen 900. The check out process allows the user to retrieve the final documents from the server 110 for viewing, printing, or signing. If the final documents are not modified, then the user can perform the check in process to move the final documents back to the server 110 (See FIG. 8). If the retailer modifies the checked out final documents, then the Client Program 215 will update the status indicator of the Document Generation screen to indicate that the documents have not been generated and force the user to regenerate the documents prior to performing the check in process (See FIG. 7). Thus, modifying the documents results in the Client Program 215 returning to step 320 of the Document Generation Phase 302.

Figure 10:
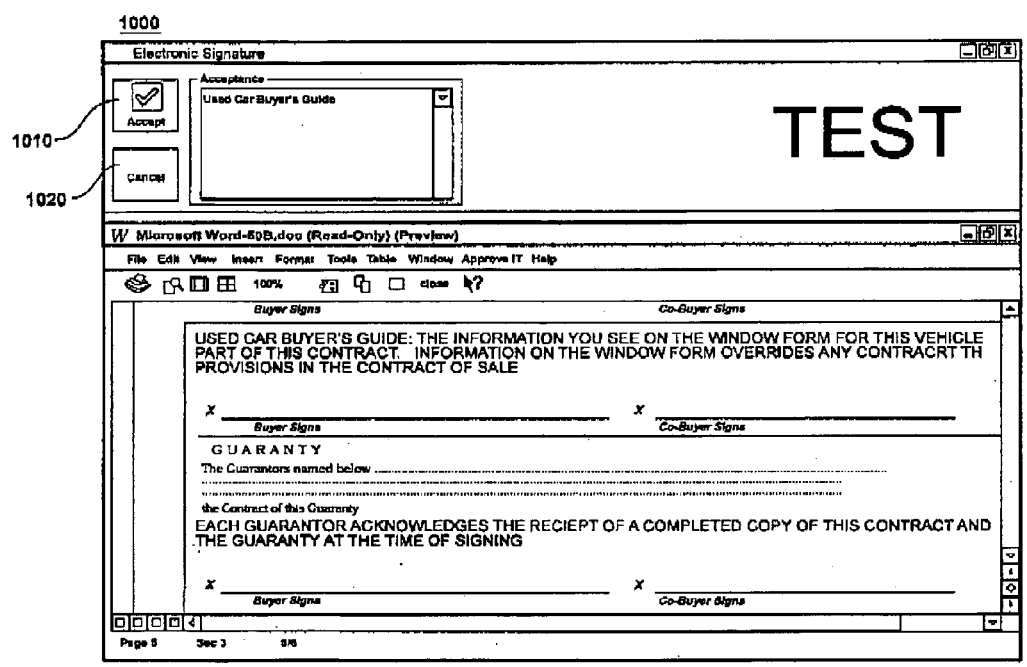
FIG. 10 is a diagram of an electronic signature screen for an exemplary embodiment of the present invention.

At step 360, the user can initiate signing of the final documents. The Credit Highway allows electronic signing of the final documents. The user may initiate the signing process for the final documents prior to performing an initial check in process or subsequent to performing a check out process. The retailer initiates the signing process by selecting the "Sign" icon 810 on the Document Generation 800 screen. The Client Program 215 then displays on the computer screen 220 a list of signature types that may be required to fully execute the document. A party to the agreement initiates the signing of the final documents by selecting the appropriate signature type. In response to selecting a signature type, the Client Program 215 displays an Electronic Signature screen on the display 220. FIG. 10 is a diagram of a typical Electronic Signature screen 1000 displayed by an exemplary embodiment of the present invention in this state.

While the Client Software Program 215 displays the Electronic Signature screen 1000, an executing party electronically signs the final documents using a signature input device 225 (as shown in FIG. 2). The Client Program 215 includes the software routines necessary to read the signature from the signature input device 225. As the party signs the document, the Client Program 215 reads the input from the signature input device 225 and displays the signature on the Electronic Signature screen 1000. Signature input devices compatible with the MB Advantage System include the Topaz System SignatureGem™ LCD tablets. After electronically signing the final documents and reviewing the displayed signature on the Electronic Signature screen 1000, the signing party may accept the electronic signature by selecting an "Accept" icon 1010 or reject the electronic signature by selecting a "Cancel" icon 1020, both displayed on the Electronic Signature screen 1000.

The final documents typically require signatures from multiple parties including a prospective customer and a retailer. During a single signature session, each party to the agreement may electronically sign the final documents. However, it is not necessary that each of the parties concurrently sign the final documents. In between the performance of each signature, the Client Program 215 will encrypt the entered signatures using the Signature Key. Prior to each party signing the final documents, the retailer may perform the check in and check out process several times.

After each party to the agreement signs the final documents, the final documents are a fully executed contract ("Electronic Agreement") and Client Program 215 displays a document generation screen similar to the Document Generation screen 800 shown in FIG. 8. The user then performs a check in process by selecting the "check in" icon 820. In response to this action, the client program 215 displays a Document generation screen similar to Document Generation screen 900 in FIG. 9. The user may then select a "Submit" icon 920 displayed on the Document Generation screen 900 to indicate that the final documents are now fully executed. Selecting the "Submit" icon 920 results in the Client Program 215 transitioning to the Electronic Agreement Control Phase 306.

The Electronic Agreement Control Phase 306 involves the client 210 and the server 110. In response to the user selecting the "Submit" icon 920, the Credit Highway will enter the Electronic Agreement Control Phase 306 directly from the Document Execution Phase 304. To enter the Document Control Phase 306 at the beginning of a new session, a user must gain access to the MB Advantage System, invoke the Credit Highway, complete the requirements of the Document Generation Phase 302 if necessary, complete the requirements of the Document Execution Phase 304 if necessary, perform the check in process, and select the "Submit" icon 920.

At step 370, the submit process is performed. The user may perform the submit process to submit the Electronic Agreement to headquarters for approval. The user initiates the submit process by selecting the "Submit" icon 920. After submitting an Electronic Agreement, no additional modifications, including adding any signatures, to the Electronic Agreement are permitted. A user can print copies of the Electronic Agreement by selecting the "Print" icon 930 on the Document Generation screen 900 or view the Electronic Agreement by selecting the "View" icon 940.

Figure 4:
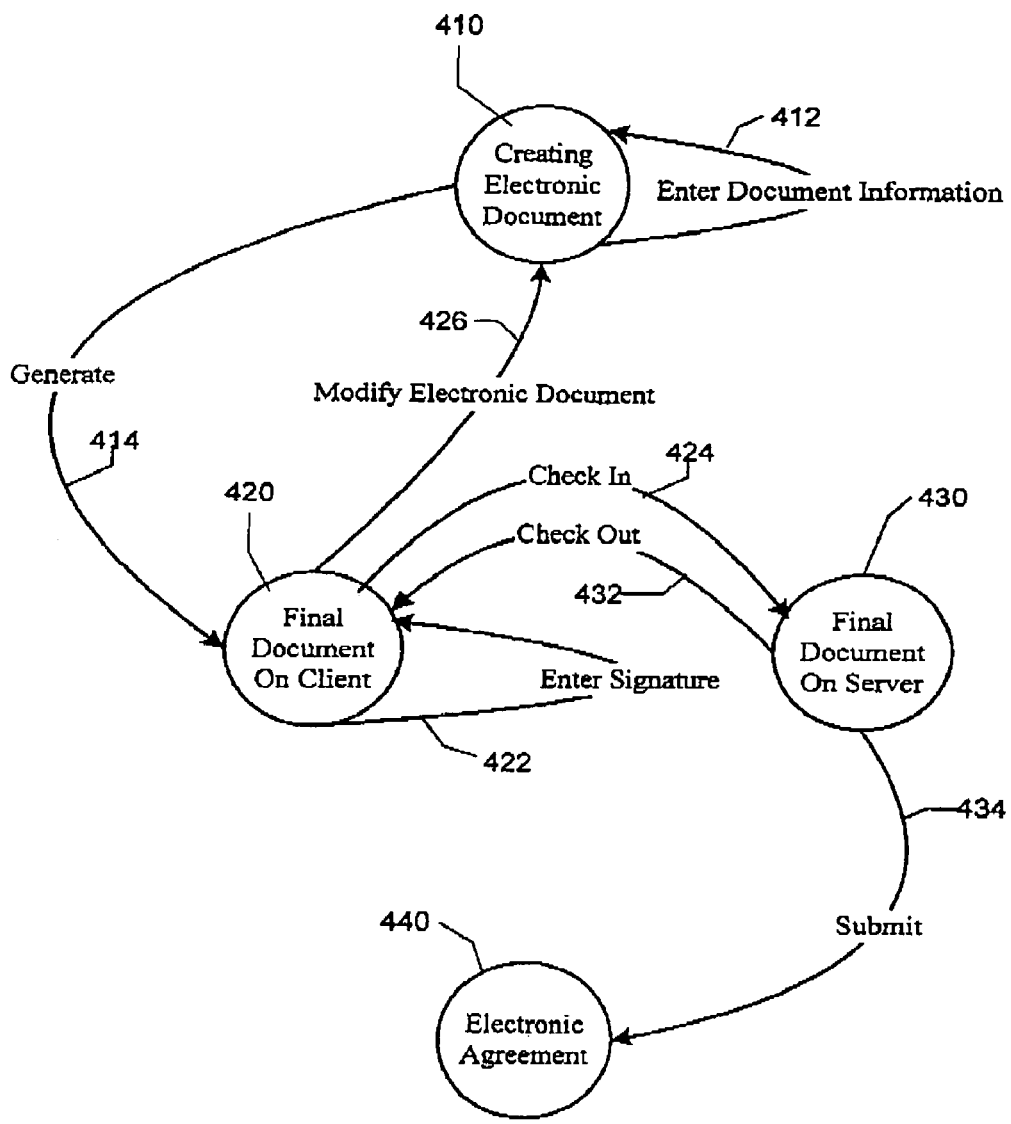
FIG. 4 is a state diagram illustrating the operation of an embodiment of the present invention in creating and managing an electronic agreement.

FIG. 4 is a state diagram illustrating the operation of an embodiment of the present invention in creating and managing an electronic agreement. FIG. 4 illustrates four states that occur in creating an electronic agreement using an embodiment of the present invention. The Creating Electronic Document state 410 coincides with the Document Generation Phase 302 in FIG. 3. As the user enters additional information or selects various options 412, processing remains in the Creating Electronic Document State 410. Upon selecting the generate function 414, processing enters the Final Document On Client state 420. In the Final Document On Client state 420, the user may invoke the signing process 422 or the check in process 424. Invoking the signing process 422 allows one or more signatures to be entered prior to returning to the Final Document On Client state 420. Invoking the check in process 424 results in a transition to the Final Document On Server state 430. The Final Document On Client state 420 and the Final Document On Server state 430 correspond with the Document Execution Phase 304 in FIG. 3. While the Final Document On Server state 430 is active and after all of the required signatures have been entered, the user may invoke the submit process 434. In response to the invoking the submit process, the Electronic Agreement state 440 is entered. In the Electronic Agreement state 440, the server 110 operates as the custodian of the authoritative copy of the electronic agreement. The Electronic Agreement state 440 corresponds with the Electronic Agreement Control Phase 306 in FIG. 3.

After the Electronic Agreement has been transferred to the server 110, the only authoritative copy of the Electronic Agreement is maintained on the database 120. Access to the Electronic Agreement is restricted to authorized users. The present invention anticipates several techniques to satisfy the recommendations of the proposed UCC revisions. In one embodiment, the authoritative copy of the Electronic Agreement includes a special header or text field that is encrypted with a separate encryption key. Any hard copies or electronic copies of the Electronic Agreement generated or created from the MB Advantage System will contain this special header or field in its encrypted state. Thus, these copies can be distinguished from the authoritative copy. In another embodiment, the MB Advantage System will add a notice to each printed or viewed copy of the Electronic Agreement indicating that the copy is not the authoritative copy of the Electronic Agreement. In yet another embodiment, the MB Advantage System maintains at all times the location of the authoritative copy of the Electronic Agreement by recording the user creating the document or the user that checked out the document last. In this embodiment, the Server Software 115 maintains the identity of the authoritative copy of the Electronic Agreement.

From the foregoing description, it will be appreciated that the present invention provides a system and a method for creating and controlling electronic agreements. In general, the system includes a server and at least one client interconnected through a communications medium. In operation, the system only allows access to authorized users. Once a user gains access, the user inputs commands and data that are necessary to create an electronic document. Upon completion of the electronic document, the user can invoke a signature process. During the signature process, the parties to the agreement enter electronic signatures. The present invention operates to encrypt the electronic document and then encrypts each of the signatures using an encryption key that is based, at least in part, on the contents of the electronic document. This aspect of the system prevents the propagation of fraudulent versions of the electronic document because any modifications to the electronic document will invalidate the encrypted signatures. Finally, the system operates to transfer the electronic agreement to a secure server. The electronic documents are considered an electronic agreement once they have been executed. The electronic agreement is then controlled by transferring the electronic agreement to the server. The server maintains the authoritative copy of the electronic agreement, thereby providing control of the electronic agreement.

Therefore, it can be seen that the present invention provides a system and method to provide for the control of an electronic chattel paper that meets some or all of the requirements proposed in the modifications to the UCC. The present invention also provides a system and method to create electronic agreements in a distributed environment, but maintains the ability to identify the party having control of the authoritative copy of the electronic agreement.

The present invention may be conveniently implemented in one or more program modules. No particular programming language has been indicated for carrying out the various tasks described above because it is considered that the operation, steps, and procedures described in the specification and illustrated in the accompanying drawings are sufficiently disclosed to permit one of ordinary skill in the art to practice the instant invention. Moreover, in view of the many different types of computers and program modules that can be used to practice the instant invention, it is not practical to provide a representative example of a computer program that would be applicable to these many different systems. Each user of a particular computer would be aware of the language and tools which are more useful for that user's needs and purposes to implement the instant invention.

The present invention has been described in relation to particular embodiments which are intended in all respects to be illustrative rather than restrictive. Those skilled in the art will understand that the principles of the present invention may be applied to, and embodied in, various program modules for execution on differing types of computers regardless of the application.

Alternative embodiments will become apparent to those skilled in the art to which the present invention pertains without departing from its spirit and scope. Accordingly, the scope of the present invention is described by the appended claims and supported by the foregoing description.

What is claimed is:

1. A system for enabling the preparation, execution and secure management of an electronic chattel paper agreement comprising:
   a server processing unit and a server memory device electrically coupled to the server processing unit;
   a client processing unit and a client memory device electrically coupled to the client processing unit;
   a server program module, stored in the server memory device, for providing instructions to the server processing unit;
   a client program module, stored in the client memory device, for providing instructions to the client processing unit, and
   a communication medium, communicatively coupling the server processing unit and the client processing unit;
   the client processing unit, responsive to the instruction of the client program module and the server processing unit, responsive to the instructions of the server program module, being operative to:

authorize access to the system;
generate at least one unexecuted electronic chattel paper document;
prevent the creation of fraudulent versions of the electronic chattel paper document;
associate signatures electrically input by parties to a chattel paper transaction with the electronic chattel paper document thereby generating an electronic chattel paper agreement; and
maintain an authoritative copy of the electronic chattel paper document in the server memory device of the server processing unit.

2. The system of claim 1, further comprising an input device electrically coupled to the client processing unit, and wherein the client processing unit and the server processing unit are being operative to authorize access to the system by:
the client processing unit
receiving access information from the input device,
transmitting the access information to the server processing unit over the communication medium, and
receiving an authorized indicator from the server processing unit over the communications medium; and
the server processing unit
receiving the access information from the client processing unit over the communications medium,
verifying that the access information qualifies for granting access to the system, and
transmitting an authorized indicator to the client processing unit over the communications medium.

3. The system of claim 1, further comprising an input device electrically coupled to the client processing unit, and where in the client processing unit and the server processing unit are operative to generate at least one electronic chattel paper document by:
the client processing unit
receiving pertinent information from the input device, and
integrating the pertinent information into an electronic template.

4. The system of claim 3, wherein the electronic template includes predefined chattel paper document information and a predefined chattel paper document format, and the client processing unit and the server processing unit are operative to integrate the pertinent information into the electronic template by:
receiving a complete indicator from the input device, the complete indicator indicating that no additional pertinent information will be received by the client processing unit, and
merging the pertinent information and the predefined document information to generate the electronic chattel paper document conforming to the predefined chattel paper document format.

5. The system of claim 1, further comprising an input device electrically coupled to the client processing unit, and where the client processing unit and the server processing unit are operative to prevent the creation of fraudulent versions of the electronic chattel paper document by the client processing unit, in response to generating the electronic chattel paper document, rejecting any attempts to modify the electronic document.

6. The system of claim 1, further comprising an input device electrically coupled to the client processing unit; and wherein the client processing unit and the server processing unit are operative to prevent the creation of fraudulent versions of the chattel paper electronic document by the client processing unit, in response to generating the electronic chattel paper document, encrypting the electronic chattel paper document and generating a signature key based at least in part on the contents of the electronic chattel paper document.

7. The system of claim 1, further comprising an input device electrically coupled to the client processing unit, and the client processing unit and the server processing unit are operative to prevent the creation of fraudulent versions of the electronic chattel paper document by:
the client processing unit,
in response to generating the electronic chattel paper document, encrypting the electronic chattel paper document, and
in response to an attempt to modify the electronic chattel paper document, rendering the electronic chattel paper document invalid.

8. The system claim 1, further comprising an input device electrically coupled to the client processing unit, and wherein the client processing unit and the server processing unit are operative to associate signatures electronically input by parties to the chattel paper transaction with the electronic chattel paper document thereby generating an electronic agreement by:
the client processing unit
receiving at least one signature input from the input device,
creating a signature file containing the signature input, and
encrypting the signature file using an encryption key that is based at least in part on the contents of the electronic chattel paper document.

9. The system of claim 1, further comprising an input device electrically coupled to the client processing unit, and the client processing unit and the server processing unit are operative to maintain an authoritative copy of the electronic chattel paper agreement in the server memory device of the server processing unit by:
the client processing unit
receiving a submit indicator from the input device, and
in response to receiving the submit indicator, transmitting the electronic chattel paper agreement and the electronically input signatures associated with the electronic chattel paper agreement to the server processing unit over the communications medium; and
the server processing unit
receiving the electronic chattel paper agreement and the electronically input signatures,
preventing any modifications to the electronic chattel paper agreement and the signature file, and
providing an unauthorized copy indicator on any electronic and hard copies of the chattel paper agreement, the unauthorized copy indicator indicating that the electronic and hard copies of the electronic chattel paper agreement are not the authoritative copy of the electronic chattel paper agreement.

10. A method for creating an electronic chattel paper agreement and maintaining an authoritative copy of the electronic chattel paper agreement, the method comprising:
(a) receiving a set of input information from an input source, the set of input information including a subset of information necessary to generate an electronic chattel paper document;
(b) in response to receiving a complete indicator from the input source, the complete indicator indicating that the received subset of input information is complete, generating an electronic chattel paper document by merging the subset of input information with a chattel paper document template;

(c) electronically receiving a set of signatures by parties to a chattel paper transaction from the input source, whereby upon receiving the set of chattel paper signatures, the electronic chattel paper document is considered an electronic chattel paper agreement; and (d) in response to receiving a submit indicator, storing the electronic chattel paper agreement within an access restricted computer system, the stored electronic chattel paper agreement constituting an authoritative copy of the electronic chattel paper agreement.

11. The method of claim 10, further comprising after generating the electronic chattel pacer document providing a signature indicator to the input source, the signature indicator indicating that the generating is complete and that the electronic chattel paper document requires the electronic input of the set of signatures.

12. The method of claim 11, further comprising prior to the receiving a set of signatures encrypting the electronic chattel paper document.

13. The method of claim 12, further comprising after the encrypting preventing the electronic chattel paper document from being modified.

14. The method of claim 10, further comprising prior to the storing encrypting the set of electronically input signatures using an encryption key, the encryption key being based at least in part, on the contents of the electronic chattel paper document, whereby if the contents of the electronic chattel paper document are modified, the electronically input signatures and the electronic chattel paper agreement will be invalid.

15. The method of claim 10, further comprising prior to the storing providing an indicator that the set of electronically input signatures has been received and that the electronic chattel paper agreement is complete.

16. In a distributed computer system including at least one server device and at least one client device communicatively coupled to the server device, a method for maintaining an authoritative copy of an electronic chattel paper agreement, the method comprising:

(a) a client device receiving a set of input information from an input source, the set of input information including a subset of information necessary to generate an electronic chattel paper document and a set of signatures necessary to make the electronic chattel paper document a binding chattel paper agreement;

(b) the client device encrypting the electronic chattel paper document using a first key and the set of signatures using a second key, the second key being based at least in part on the contents of the electronic chattel paper document, whereby any modifications to the electronic chattel paper document would result in invalidating the set of signatures;

(c) the client device transferring the encrypted electronic chattel paper document and the encrypted set of signatures to a server device over a communications medium, the server device being access restricted, the stored electronic chattel paper document and set of signatures constituting the only authoritative copy of the electronic chattel paper agreement.

17. A client system operating within an electronic chattel paper document system, the electronic chattel paper document system including a server, a server memory storage device and a server program module, the client system comprising:

a client processing uint;
a client memory device, a display device and an input device all electrically coupled to the client processing unit; a client program module, stored in the client memory, for proving instructions to the client processing unit;
a communication medium, communicatively coupling the client system to the electronic document system; and
the client processing unit, responsive to the instructions of the client program module, being operative to:
authorize access to the electronic chattel paper document system by
receiving access information from the input device,
transmitting the access information to the server over the communication medium, and
receiving an authorization indicator from the server processing unit over the communication medium;
generate at least one electronic chattel paper document;
prevent the creation of fraudulent versions of the electronic chattel paper document;
associate electronically input signatures with the electronic chattel paper document thereby generating an electronic chattel paper agreement,
receiving a set of signatures from the input device,
creating at least one signature file containing the set of signature, and
encrypting the signature using a encryption key that is based at least in part on the contents of the electronic chattel paper document; and
transfer the electronic chattel paper document and the encrypted signature file as an electronic chattel paper agreement to the server over the communication medium.

18. The client system of claim 17, wherein the client processing unit is operative to generate at least one electronic chattel paper document by:
receiving pertinent information from the input device; and
merging the pertinent information with predefined chattel paper document information to generate an electronic chattel paper document conforming to a predefined chattel paper document format.

19. The client system of claim 17, wherein the client processing unit is operative to prevent the creation of fraudulent versions of the electronic chattel paper document by, after generating the electronic chattel paper document, encrypting the electronic chattel paper document and rejecting any attempts to enter additional pertinent information.

20. The system of claim 17, wherein the client processing unit is operative to prevent the creation of fraudulent versions of the electronic chattel paper document by:
detecting an attempt to modify the electronic chattel paper document, and
in response to detecting an attempt, rendering the electronic chattel paper document invalid.

* * * * *